(12) United States Patent
Bigelow

(10) Patent No.: US 7,413,441 B2
(45) Date of Patent: Aug. 19, 2008

(54) THREE DIMENSIONAL SARCOMERE TEACHING MODEL

(76) Inventor: Mark J. Bigelow, 763 Riverside Dr., Ormand Beach, FL (US) 32176

( * ) Notice: Subject to any disclaimer, the term of this patent is extended or adjusted under 35 U.S.C. 154(b) by 452 days.

(21) Appl. No.: 11/164,403

(22) Filed: Nov. 22, 2005

(65) Prior Publication Data

US 2006/0199158 A1 Sep. 7, 2006

Related U.S. Application Data

(60) Provisional application No. 60/522,953, filed on Nov. 24, 2004.

(51) Int. Cl.
G09B 23/28 (2006.01)
(52) U.S. Cl. .................................................... 434/272
(58) Field of Classification Search ................ 434/262, 434/267, 272, 274, 302
See application file for complete search history.

(56) References Cited

U.S. PATENT DOCUMENTS

| | | | |
|---|---|---|---|
| 971,026 A | 9/1910 | De Zeng | 434/271 |
| 1,476,621 A | 12/1923 | Kintner | 434/271 |
| 1,535,163 A | 4/1925 | Kintner | 434/271 |
| 1,630,944 A | 5/1927 | Ingersoll | 434/271 |
| 1,832,603 A | 11/1931 | Witt | 434/271 |
| 2,068,950 A | 1/1937 | Hamilton | 434/271 |
| 2,136,735 A | 11/1938 | Dunn | 434/271 |
| 2,197,975 A * | 4/1940 | Fleet | 434/274 |
| 2,483,034 A * | 9/1949 | Braeg | 434/274 |
| 3,177,593 A | 4/1965 | Loeb | 434/274 |
| 3,188,753 A * | 6/1965 | Lovercheck | 434/274 |
| 3,376,659 A | 4/1968 | Asin et al. | 434/272 |
| 3,748,366 A | 7/1973 | Rader et al. | 434/272 |
| 4,058,910 A | 11/1977 | Funk | 40/381 |
| 4,167,070 A | 9/1979 | Orden | 40/381 |
| 4,205,465 A | 6/1980 | Mannarino | 434/258 |
| 4,323,351 A | 4/1982 | Goldsmith | 434/274 |
| 4,332,570 A * | 6/1982 | Getty | 434/274 |
| 4,624,642 A | 11/1986 | Ferrara | 434/274 |
| 4,850,877 A * | 7/1989 | Mason et al. | 434/274 |
| 4,938,696 A | 7/1990 | Foster et al. | 434/267 |
| 5,044,960 A | 9/1991 | De Porteous | 434/274 |
| 5,158,461 A | 10/1992 | Sulway | 434/268 |
| 5,221,208 A | 6/1993 | Alexander | 434/271 |
| 5,634,797 A | 6/1997 | Montgomery | 434/268 |
| 5,722,413 A | 3/1998 | Futcher et al. | 128/668 |

(Continued)

Primary Examiner—Kurt Fernstrom
(74) Attorney, Agent, or Firm—John C. Smith

(57) ABSTRACT

A three-dimensional sarcomere muscle cell teaching model which contracts and extends. A slide mechanism and support base allows opposing rigid walls which represent sarcomere cell Z-Band structures to slide in relation to one another. A rigid wall representing the sarcomere cell M-Line structure is positioned between the Z-Band structures. A plurality of rods representing Myosin Rods extends outward on each side of the M-Line structure toward the Z-Band opposing structures. Other rods, representing Actin Rods, extend from each of the Z-Band structures toward the M-Line structure. Each Actin Rod corresponds to one or more Myosin Rods, is positioned between the M-Line and Z-Band structures, and slide past one another when the Z-Band structures are moved. Opposing tension is applied to the Myosin Rods to maintain them in position between the Z-Band structures. Filaments extend from the Actin and Myosin Rods to simulate the interaction between the Actin and Myosin Rods.

1 Claim, 10 Drawing Sheets

U.S. PATENT DOCUMENTS

| | | | |
|---|---|---|---|
| 5,839,904 A | 11/1998 | Bloom | 434/268 |
| 5,873,734 A * | 2/1999 | Griswold et al. | 434/274 |
| 5,908,302 A | 6/1999 | Goldfarb | 434/262 |
| 6,062,866 A | 5/2000 | Prom | 434/268 |
| 6,234,804 B1 | 5/2001 | Yong | 434/267 |
| 6,234,805 B1 | 5/2001 | Rubin | 434/271 |
| 6,296,490 B1 | 10/2001 | Bowden | 434/265 |
| 6,582,232 B1 * | 6/2003 | Ney | 434/270 |
| 2002/0098467 A1 * | 7/2002 | Dente | 434/262 |

* cited by examiner

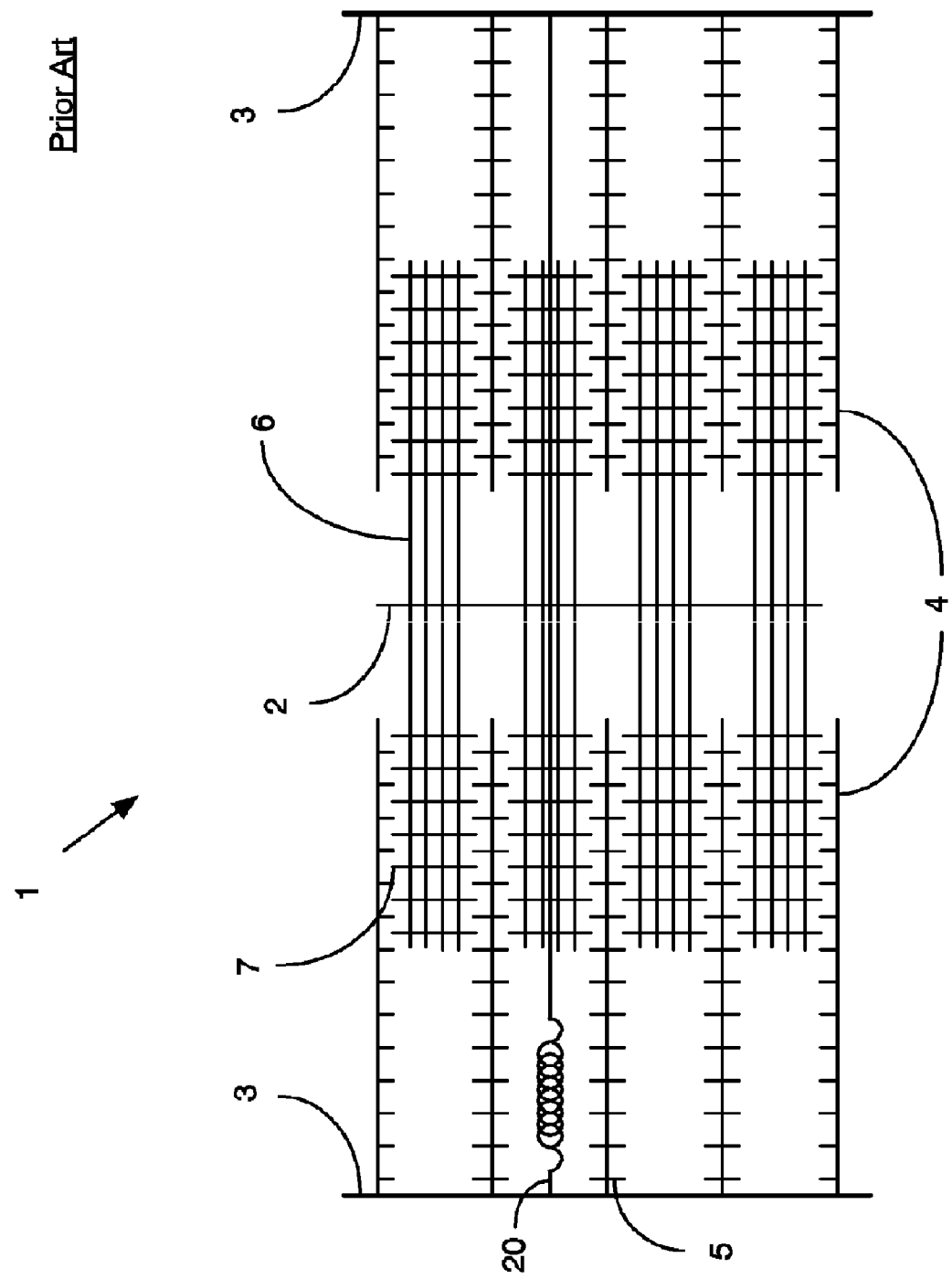

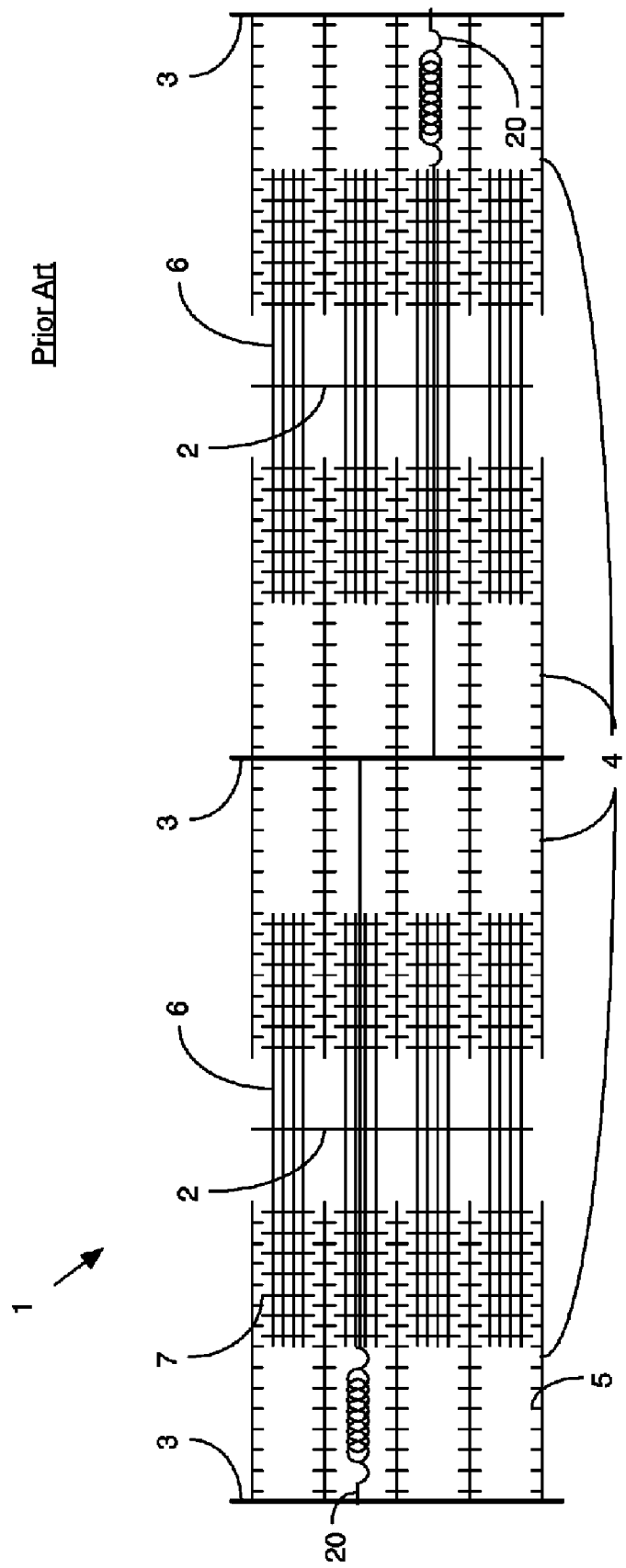

THREE DIMENSIONAL SARCOMERE TEACHING MODEL

CROSS-REFERENCE TO RELATED APPLICATIONS

This application is related to, and claims the benefit of, the provisional patent application entitled "Three Dimensional Sarcomere Teaching Model," filed Nov. 24, 2004, bearing U.S. Ser. No. 60/522,953 and naming Mark Bigelow, the named inventor herein, as sole inventor, the contents of which is incorporated by reference herein in its entirety.

BACKGROUND OF THE INVENTION

1. Technical Field

The present invention relates to anatomical teaching models. In particular, it relates to an anatomical teaching model that illustrates a sarcomere muscle cell.

2. Background

A variety of teaching methods are used in the biological and medical arts studies. One method of teaching the subject matter has been the development of three-dimensional models which allows students to better visualize the interrelationship between organs in a patient's body, as well as components of individual organs.

Typically, these models are used to describe major organs, or organ systems. For example, a number of models have been developed to teach ocular systems, and to show the interrelationship of components of the human eye. Some of these models show structural elements of a healthy eye, and some are designed to illustrate the effect of various injuries or diseases.

Other models have been developed to illustrate major systems such as the gastrointestinal tract. The typically provide a three-dimensional model which students can use to better understand the digestive system.

Still other models have been developed to illustrate the interconnection of organs for the purpose of understanding how drugs are processed in the body.

Other models have been developed to illustrate the circulatory system and the lungs to illustrate how the systems support the organs of the body.

Models have also been developed to illustrate mechanical functions performed by the skeleton and the muscular system.

The foregoing models are designed to teach how organs and/or internal biological systems work. In addition, another type of model has been developed to teach practical skills such as surgery. These models allow physicians and surgeons to test various methods without risking injury to an actual patient.

While the prior art models have been very useful for teaching large organ systems, and surgical techniques related to those organs, the prior art is largely ignored the smaller elements which form the building blocks of large organs. For example, there are no three-dimensional teaching models which show the internal workings of individual cells of particular types of organs. In particular, there are no three-dimensional models which illustrate the internal workings of muscle cells. It would be desirable to have a three-dimensional model of a muscle cell for the purpose of teaching biology and medical students how such cells work.

While the prior art has provided numerous types of models, it has failed to provide a three-dimensional model which illustrates the internal components of a muscle cell, and how those components interrelate to one another.

SUMMARY OF THE INVENTION

The present invention provides a mechanical three-dimensional model for teaching the process by which a sarcomere muscle cell is able to contract and/or return to a normal extended (i.e., relaxed) position. The model uses a base that supports two opposing rigid walls which represent the Z-Band structures in a sarcomere muscle cell. Another rigid wall, which represents the M-Line structure in the sarcomere muscle cell, is positioned between the two Z-Band structures. A plurality of rods representing Myosin Rods extend outward from the M-Line structure toward the opposing Z-Band structures. A second set of rods, representing Actin Rods, extends from each of the Z-Band structures toward the M-Line structure. Each of the Actin Rods corresponds to one or more Myosin Rods and is positioned in relation to the Myosin Rod's structures such that they slide past one another in close proximity when the Z-Band panels are moved. Filaments extend between the Actin Rods and the Myosin Rods to simulate the interaction between the Myosin Rods and Actin Rods which exist in an actual muscle cell.

BRIEF DESCRIPTION OF THE DRAWINGS

FIG. 1 is a prior art illustration that illustrates the relative arrangement and interrelation of components of an actual sarcomere cell in muscle tissue when it is in the extended, or relaxed, position.

FIG. 2A is a prior art illustration that illustrates the relative arrangement and interrelation of components of a pair of adjacent sarcomere cells in muscle tissue when they are in the relaxed position.

DESCRIPTION OF THE PREFERRED EMBODIMENT

Figure 2B:
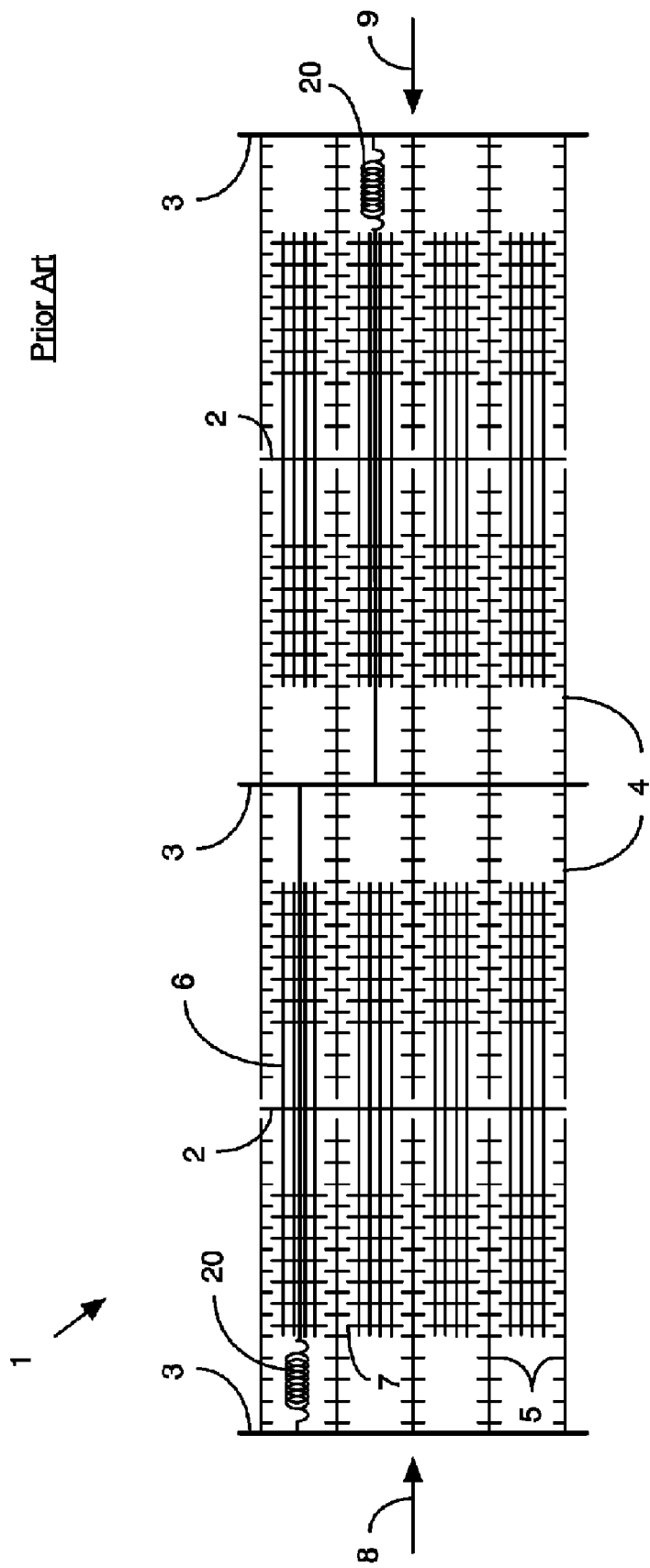
FIG. 2B is a prior art illustration that illustrates the relative arrangement and interrelation of components of a pair of adjacent sarcomere cells in muscle tissue when they are in the contracted position.

Prior to a detailed discussion of the figures, a general overview of the invention will be presented. This invention provides a movable three-dimensional model of a sarcomere cell that is used as an anatomical teaching model to teach medical, biology, or other students, how the sarcomere muscle cells will expand and contract to cause skeletal movement.

The device provided by the present invention is a three-dimensional model for teaching how a sarcomere muscle cell contracts and then returns to a normal extended (i.e., relaxed) position. The model uses a support platform which supports two opposing movable rigid walls which represent the Z-Band structures in a sarcomere cell. Another rigid wall, which represents the M-Line structure in the sarcomere cell is also secured to the support platform. It is positioned between the two movable Z-Band structures just as it is in an actual muscle cell.

In an actual muscle cell, a plurality of rods, representing the Actin Rods in muscle cells, extend outward on each side of the M-Line structure toward the opposing Z-Band structures. A second set of rods, also representing the Actin Rods in muscle cells, extend from each of the Z-Band structures toward the M-Line structure. Each of the Actin Rods corresponds to one or more Myosin Rods and is positioned such that the Actin Rods and the Myosin Rods can slide past one another in close proximity. Filaments extend from the Myosin Rods to the Actin Rods to simulate the filament interaction between the Myosin Rods and Actin Rods which exist in an actual muscle cell. During an actual muscle contraction, filaments on the Actin Rods and Myosin Rods interact with one another to pull the Z-Band structure toward the M-Line structure. The motion of the filaments is similar in form to that of peristalsis. This contraction is controlled by injection of calcium into the cell structures. When calcium is injected into the cell, Actin Rods and Myosin Rods pull the Z-Band structures toward the M-Line structure which results in a contraction of the cell. When calcium is removed from the muscle cell, the Actin Rods and Myosin Rods cease to pull the Z-Band structures together, and the muscle cell returns to the relaxed position.

The Z-Band structures in the muscle cell separate adjoining muscle cells. As a result, when the muscle cells in a muscle are simultaneously contracted, all of the cells act in concert to form a significant contraction which allows motion of individual.

The invention provides a three-dimensional mechanical model designed to help students understand the workings of the sarcomere cell. It provides a mechanical structure which simulates components of the sarcomere cell, and shows how those components are moved in relationship to one another. It provides a visual, mobile teaching aid that shows how each component of the muscle cell cooperates with one another to cause movement.

Having discussed the features and advantages of the invention in general, we now turn to a more detailed discussion of the figures.

FIG. 1 is a prior art illustration directed to an actual sarcomere cell 1 in a muscle. This figure, along with FIGS. 2A-B and 3A-B illustrate the structure and relative arrangement and interaction of actual sarcomere cells 1 in muscle tissue when they are in the extended, or relaxed, position, as well as in the contracted position. In FIG. 1, the sarcomere cell 1 is shown in the relaxed position. The Z-Band structures 3 are shown at opposing ends of the sarcomere cell 1. The Z-Band structures 3 are located distally from one another, provides the structure for, and defines the longitudinal ends of the sarcomere cell 1. Positioned between Z-Band structures 3 is the M-Line structure 2. The M-Line structure 2 is a membrane that secures the Myosin rods 6 such that they are positioned between the Z-Bands 3. Further, the Myosin Rods 6 are arranged in cooperative engagement with the Actin Rods 4, described below.

In the relaxed position, the Z-Band structures 3 are separated from the M-Line structure 2 by a substantial distance.

As shown in this figure, a number of Actin Rods 4 extend from each of the Z-Band structures 3 toward the M-Line structure 2. Filaments 5 extend from the Myosin Rods 6. These filaments 5 are used to engage the Actin Rods 4, described below.

Also shown in this figure are Myosin Rods 6. The Myosin Rods 6 are secured by the M-Line structure 2. Each end of the Myosin Rods 6 is positioned in close proximity to the Actin Rods 4 that extend from the Z-Band structures 3. The ends of the Myosin Rods 6 have filaments 7 which extend outward toward the Actin rods 4. The filaments 7 on the Myosin Rods 6 engage the Actin Rods 4 to force the Z-Band structures 3 to move toward the M-Line structure 2 during muscle contraction. Muscle contraction is controlled by a mechanism (not shown) which releases calcium into the cell. The effect of the calcium is to cause the filaments 5, 7 to engage and move in relation to one another, which in turn causes the Actin Rods 4 to be pulled toward the M-Line structure 2. This results in the Z-Band structures 3 being pulled together to contract the sarcomere cell 1.

Also shown in this figure is a tension structure 20 which exerts a force that returns the sarcomere cell 1 to the relaxed position when the calcium is withdrawn from the sarcomere cell 1 to end the contraction. The tension structure 20 is a protein, called titin, which pushes the Z-Band structures 3 back to the relaxed position when they are released from the contracted position by removal of calcium from the sarcomere cell 1. Likewise, if the Z-Band structures 3 of the sarcomere cell 1 are stretched to an extended position by pressure from other muscles in the body, the tension structure 20 will also return the sarcomere structure 1 to the relaxed position when the external pressure is removed.

FIG. 2A is a prior art illustration that shows the relative arrangement and interaction of a pair of contiguous sarcomere cells 1 in muscle tissue when they are in the relaxed position. As noted above, a muscle cell uses calcium to cause cellular contractions. As illustrated in FIG. 2B, when calcium is injected into the muscle cell, it causes the filaments 5, 7 to engage one another and move the Actin Rods 4 which extend from the Z-Band structures 3 toward the M-Line 2. As a result, the Z-Band structures 3 are pulled toward one another along directional lines 8-9, and the sarcomere cells 1 contract.

Figure 3A:
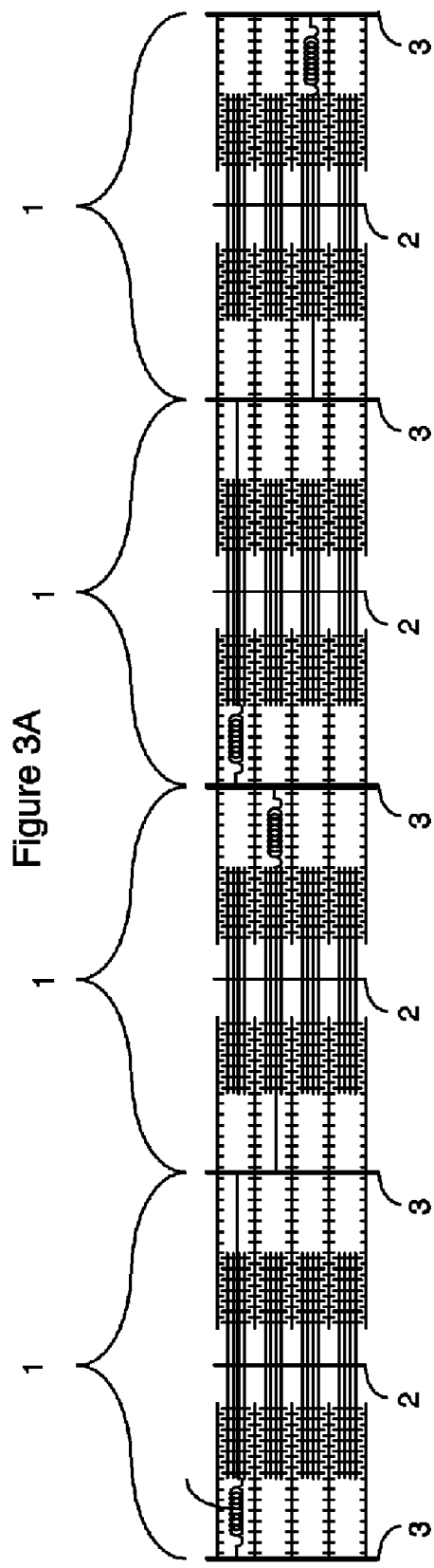
FIG. 3A is a prior art illustration that illustrates a series of adjoining muscle sarcomere cells in the extended, or relaxed, position.

FIG. 3A is a prior art illustration which shows a series adjoining sarcomere cells 1 in the relaxed, position. Typically, sarcomere cells 1 are arranged in end-to-end fashion as shown. Because the sarcomere cells 1 are in a relaxed position, they collectively have an extended length. For this illustration, only four adjoining sarcomere cells 1 are shown. Those skilled in the art will recognize that due to the size of sarcomere cells 1 in an actual muscle, many thousands of sarcomere cells 1 will be arranged in this manner to form a muscle. For example, a sarcomere cell 1 in a muscle is about 2.4 micrometers long at rest. It can be extended to approximately 3 micrometers or more, and contracted to 2 micrometers or less. As can be seen, a large mammalian muscle may require millions of these sarcomere cells 1 arranged end-to-end to form the entire muscle structure.

Figure 3B:
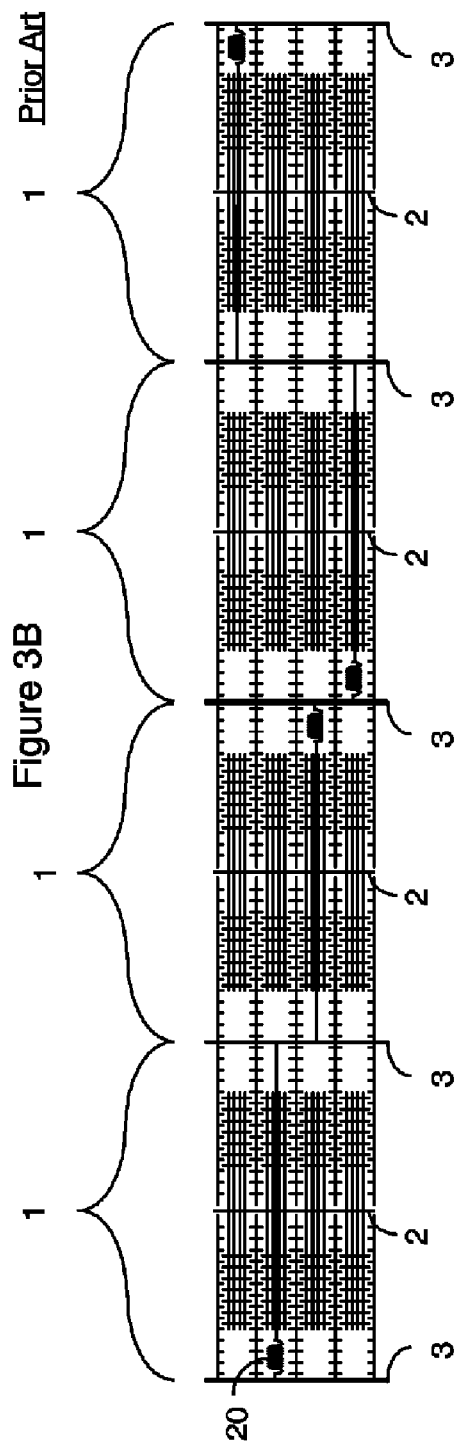
FIG. 3B is a prior art illustration that illustrates a series of adjoining muscle sarcomere cells in the contracted position.

FIG. 3B is a prior art illustration which shows adjoining sarcomere cells 1 in the contracted position. When calcium is injected into the sarcomere cells 1, it causes the cells to contract. Since they are aligned end to end, the net effect is a substantial decrease in length during muscle contraction.

Figure 4:
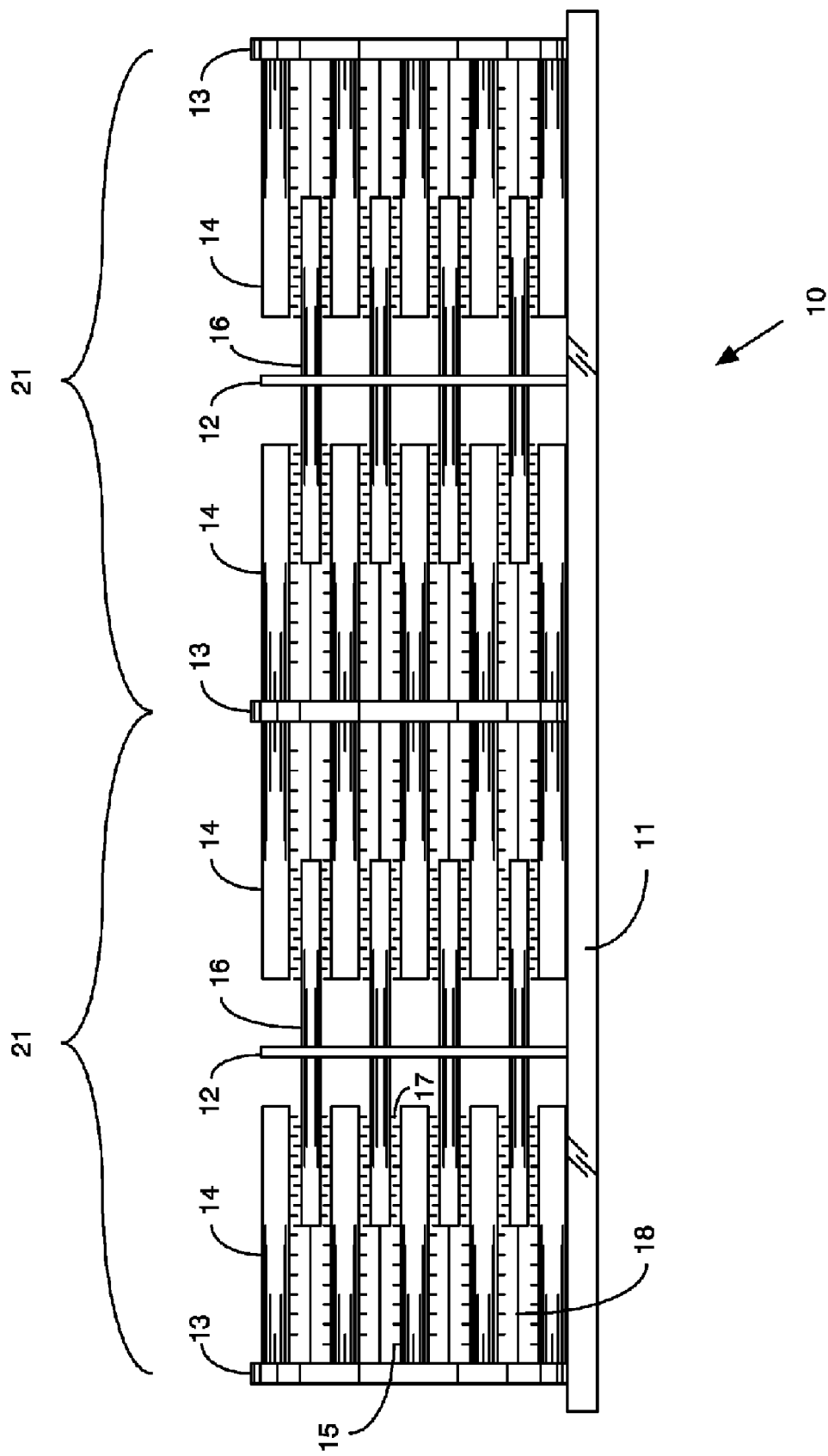
FIG. 4 is a side view of a preferred embodiment of the three-dimensional sarcomere teaching model.

FIG. 4 illustrates a preferred embodiment of the sarcomere cell 1 teaching model 10. The teaching model 10 used in this embodiment provides a mechanical teaching device which illustrates the movement of two adjacent sarcomere cell models 21 and their internal components during the process of muscle contraction and relaxation. The teaching model 10 uses a support platform 11, which is secured to the central M-Line panel 12, and slidable support for the rigid Z-Band panels 13 which are arranged at either end of the teaching model 10. A plurality of simulated Myosin Rods 16 are secured to the M-Line panel 12, and project outward from both sides of the M-Line panel toward the Z-Band panels 13. Likewise, each of the Z-Band panels 13 also support a plurality of simulated Actin Rods 14 which are secured to the Z-Band panels 13 and project outward toward the M-Line panel 12. In this figure, the simulated Myosin Rods 16 are simulated by a series of rigid rods which are secured between a Z-Band panel 13 and the M-Line panel 12 via opposing tension supports 18 which counter one another such that each of the simulated Myosin Rods 16 is positioned substantially between the M-Line panel 12 and a Z-Band panel 13. For the purposes of the teaching model 10, the opposing tension supports 18 represent the function provided by the tension structure 20 in an actual sarcomere cell 1.

Also illustrated in this figure are simulated Actin Rod filaments 15 and simulated Myosin Rod filaments 17. The simulated Actin Rod filaments 15 and simulated Myosin Rod filaments 17 are in slidable contact with one another such that when the Z-Band panels 13 are moved in relation to the M-Line panel 12, the simulated Actin Rod and Myosin Rod filaments 15, 17 slide past one another. Likewise, as the outer Z-Band panels 13 move in relation to the M-Line panels 12, the tension supports 18 balance the pressure in each direction such that the simulated Myosin Rods 16 remain approximately centered between the Z-Band panels 13 and their respective M-Line panel 12.

Those skilled in the art will recognize that any suitable material can be used to fabricate the components of teaching model 10. For example, any suitable rigid material, such as metal, wood, plastic, etc., can be used to fabricate the support platform 11, the M-Line panel 12, Z-Band panels 13, simulated Actin Rods 14, or the simulated Myosin Rods 16. Likewise, for teaching purposes any suitable material can be used to fabricate filaments 15, 17 so long as they simulate interaction of actual filaments 5, 7 in a muscle cell. In regard to tension supports 18, any suitable method can be used to provide tension to the simulated Myosin Rods 16. For example, ordinary springs can be used, bungee material can be used, etc. The only requirement is that the simulated Myosin Rods 16 are properly positioned between the Z-Band panels 13 in the simulated Actin Rods 14.

Figure 5A:
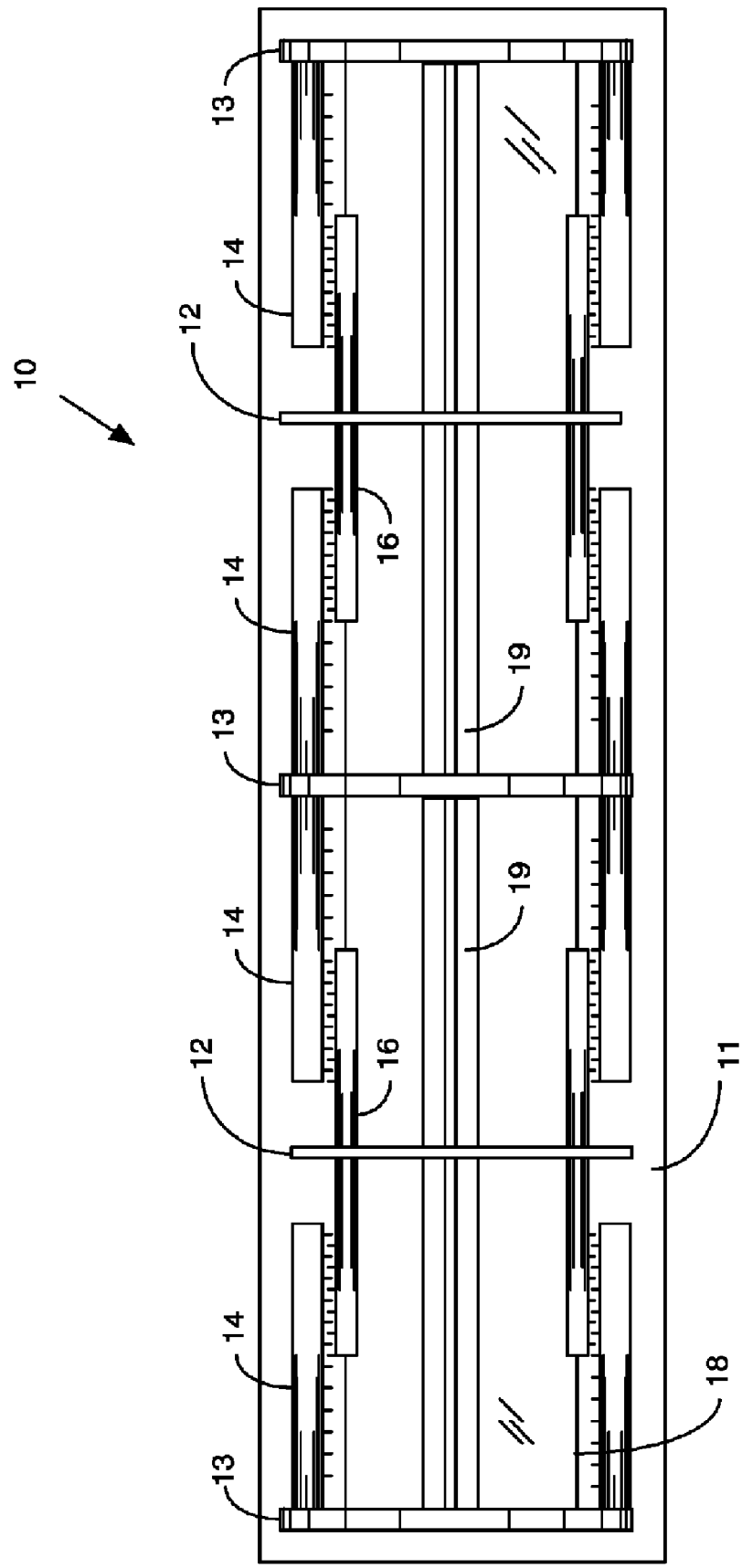
FIG. 5A is a top view of a preferred embodiment of the three-dimensional sarcomere teaching model which shows the Z-Band panels in the extended, or relaxed, position.

FIG. 5A is a top view of a preferred embodiment of the three-dimensional sarcomere teaching model 10 which shows the Z-Band panels 13 in the extended, or relaxed, position. For ease of discussion and illustration, most of the Actin Rods 14 and Myosin Rods 16 have been deleted from the illustration to more clearly illustrate the sliding track 19 which is located in the support platform 11. Of course, the sliding track 19 can be positioned in ay convenient location, and can also be implemented as more than one track.

When the instructor desires to illustrate sarcomere cell 1 contraction, the instructor will cause the Z-Band panels 13 to move inward from this position toward the M-Line panel 12. As this happens, the spring-loaded simulated Myosin Rods 16 are positioned between the Z-Band panel 13 and the M-Line panel 12 by tension supports 18 such that they remain approximately equidistant between the opposing Z-Band panels 13.

Figure 5B:
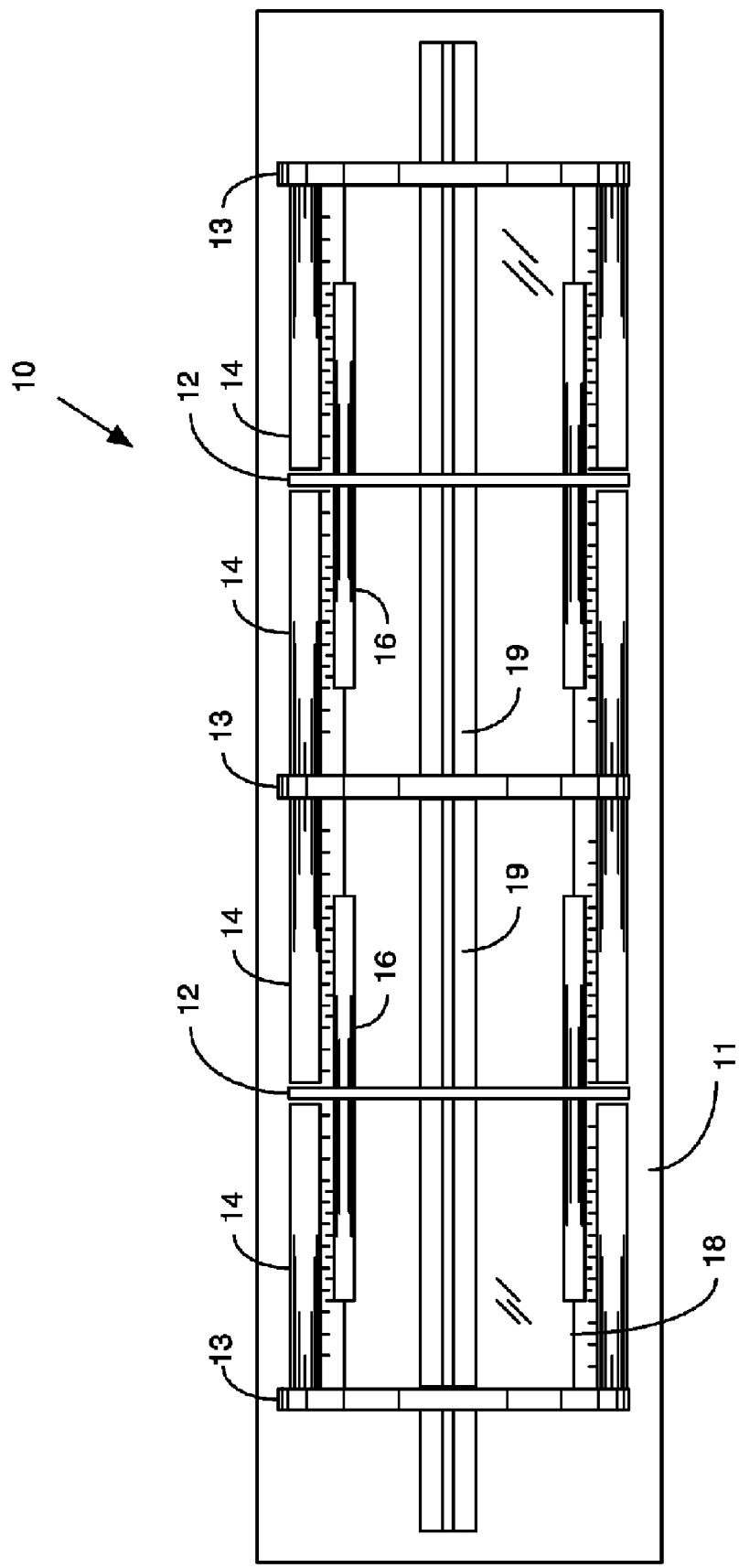
FIG. 5B is a top view of a preferred embodiment of the three-dimensional sarcomere teaching model which shows the Z-Band panels in the contracted position.

FIG. 5B is a top view of a preferred embodiment of the three-dimensional sarcomere teaching model 10 which shows the Z-Band panels 13 in the contracted position. During the contraction process the Z-Band panels 13 slide along tracks 19 to ensure that all the components remain in proper alignment with one another. As was the case above, in regard to FIG. 5A, simulated Actin Rods 14 and simulated Myosin Rods 16 are not illustrated in the central portion of the sarcomere teaching model 10 in order to better illustrate the position of track 19 in regard to the Z-Band panels 13.

Figure 6:
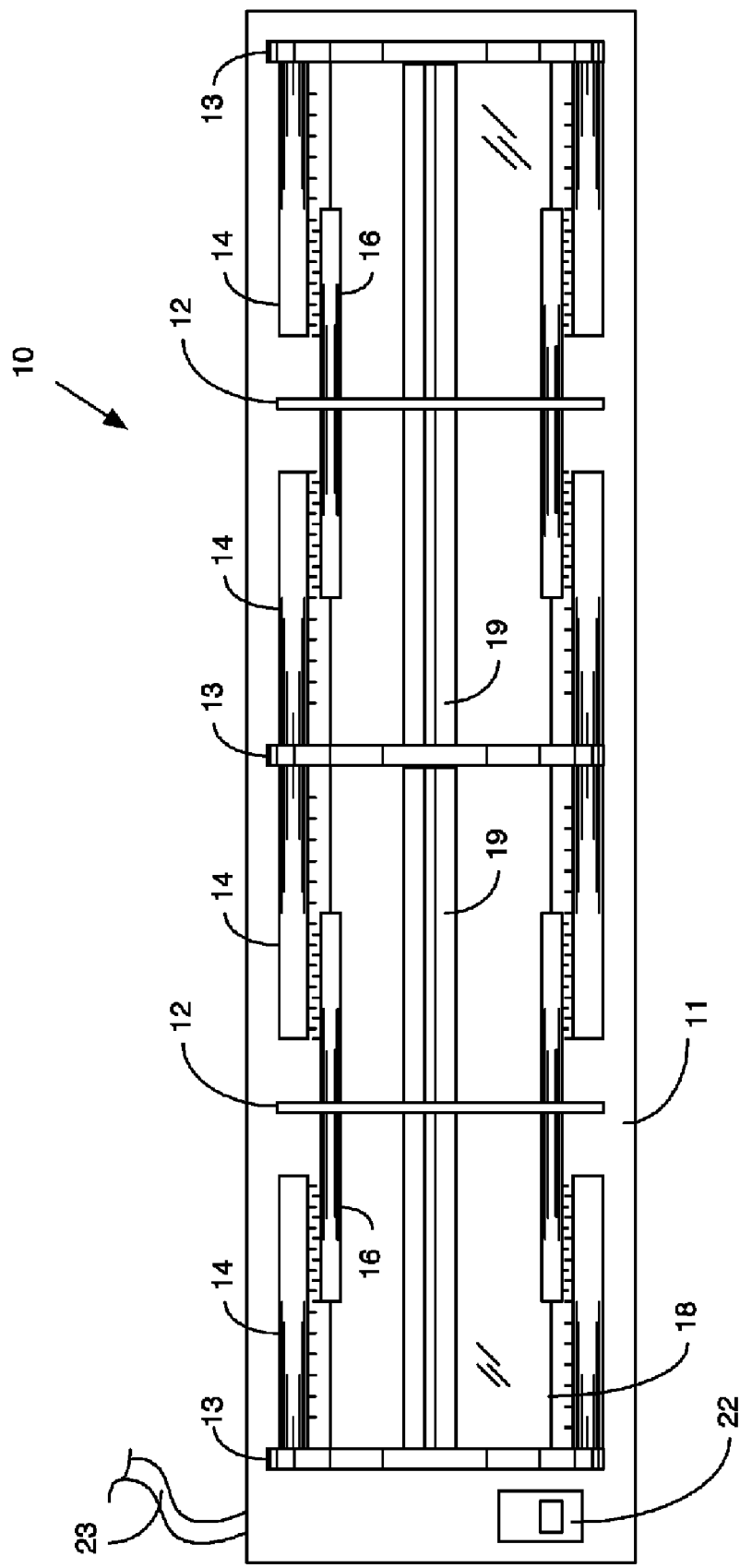
FIG. 6 illustrates the top view of an alternative preferred embodiment of three-dimensional sarcomere teaching model which uses a motorized drive to reciprocate the Z-Band panels.

FIG. 6 illustrates a top view of an alternative preferred embodiment of the three-dimensional sarcomere teaching model 10 which uses a motorized drive to reciprocate the Z-Band panels 13. As was the case above, for ease of discussion and illustration, the simulated Actin Rods 14 and simulated Myosin Rods 16, which were located above the track 19, were deleted from this illustration.

This embodiment illustrates a version of the sarcomere teaching model 10 which has an optional motor drive to reciprocate the Z-Band panels 13 in relation to the M-Line panel 12. Shown in this figure are a power switch 22 which is used to activate an internal motor (not shown), and a power line cord 23. In the preferred embodiment, it is envisioned that the motor is incorporated into the body of the support platform 11. Likewise, the reciprocating drive which moves the Z-Band panels 13, and which is powered by the motor, is also not shown. Motors and reciprocating drives are well known in the art and do not require further explanation here. Those skilled in the art will also recognize that while a power line cord 23 is illustrated, batteries can also be used. In the case of a battery-operated embodiment, it is preferred that the batteries would also be stored inside the support platform 11.

Figure 7:
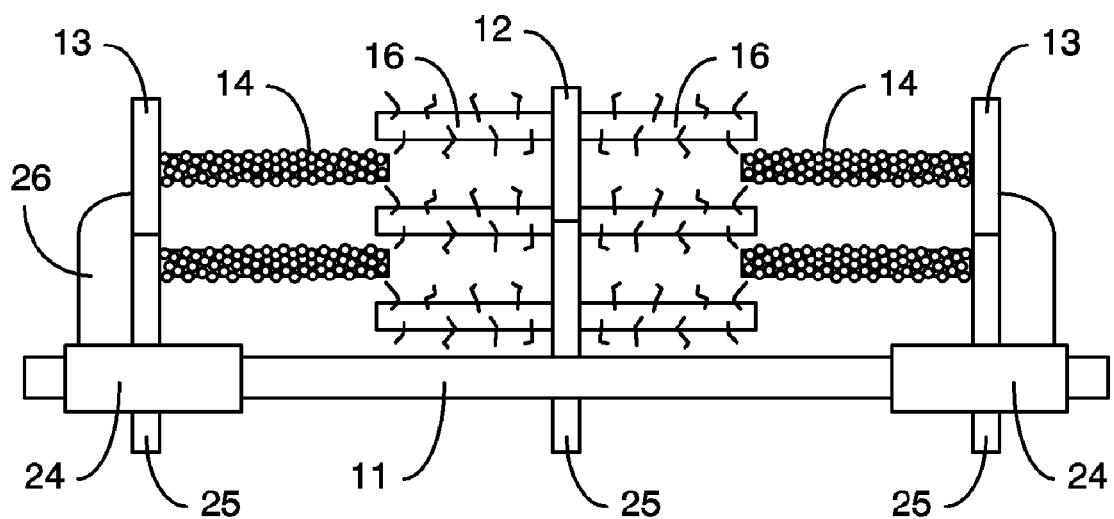
FIG. 7 is a side view of an alternative referred embodiment of the three-dimensional star premier teaching model which uses a manual sliding mechanism to reciprocate the Z-Band panels.

FIG. 7 is a side view of an alternative referred embodiment of the three-dimensional sarcomere teaching model 10 which uses a manual sliding mechanism to reciprocate the Z-Band panels 13. As can be seen from this figure, support platform 11 provides support for M-Line panel 12. The Z-Band panels 13 are secured to slidable supports 24. In addition, handles 26 are shown attached to slidable supports 24 and Z-Band panels 13. To demonstrate contraction and extension of the sarcomere muscle cell, the user merely rests handles 26 and moves them laterally to and from the M-Line panel 12. Also shown in this figure are support legs 25.

Figure 8:
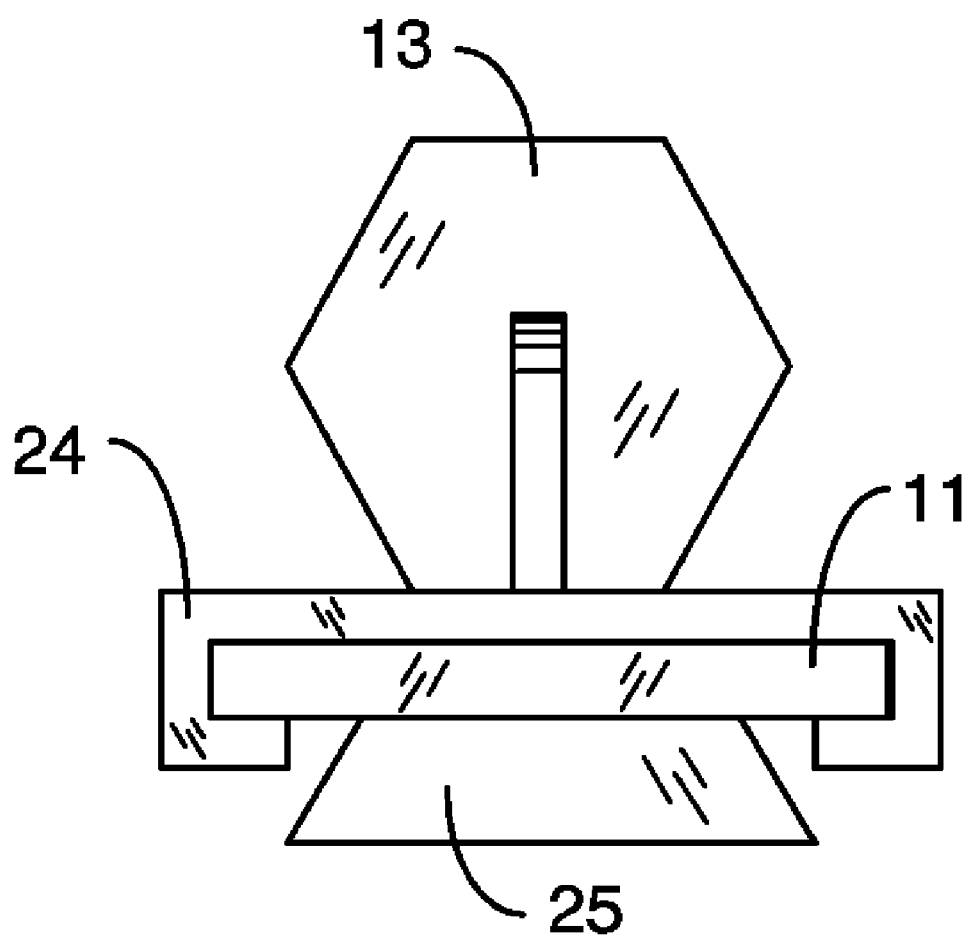
FIG. 8 is an interview of the alternative preferred embodiment of FIG. 7.

FIG. 8 is an end view of the alternative preferred embodiment of the sarcomere teaching model 10 shown in FIG. 7. As can be seen from this figure, slidable supports 24 are slidably attached to support platform 11. In addition, support legs 25 per shown extending downward from the bottom of support platform 11. Support legs 25 can take any desired form so long as they do not interfere with movement of slidable supports 24.

Those skilled in the art will recognize that the particular physical embodiment of the sarcomere teaching model 10 disclosed in the previous embodiments is intended to be used for illustrative purposes only. To illustrate or teach how a sarcomere muscle cell functions, the sarcomere teaching model 10 can take any number of forms. For example, the thickness and shape of the Z-Band panels 13 and the M-Line panels 12 can vary. The shape and number of Actin Rods 14 and Myosin Rods 16 can vary. The type of material used for the filaments 15, 17 can vary. The tension mechanism 18 which is used to control the position of the Myosin Rods 16 can be anything suitable for its purpose. The device can be powered or manually operated. It as a result, particular embodiments used to describe features and components of the invention should be taken as illustrative examples only.

While the invention has been described with respect to a preferred embodiment thereof, it will be understood by those skilled in the art that various changes in detail may be made therein without departing from the spirit, scope, and teaching of the invention.

I claim:

1. A three-dimensional sarcomere teaching model, further comprising:

a support platform;

at least one M-Line panel secured to the support platform;

at least one pair of opposing Z-Band panels, each Z-Band panel pair arranged on opposite sides of the M-Line panel;

means to move Z-Band panels in a reciprocating fashion toward and away from one another;

a plurality of simulated Actin Rods, each simulated Actin Rod having simulated filaments, and secured to and extending from the Z-Band panels;

a plurality of simulated Myosin Rods, each simulated Myosin Rod having simulated filaments;

the simulated Actin Rods and the simulated Myosin Rods further positioned such that when the Z-Band panels are reciprocated in relation to one another, the Actin Rods and the Myosin Rods slide past one another close proximity such that the filaments of the simulated Actin Rods come in slidable contact with the filaments of the Myosin Rods;

whereby the sarcomere teaching model illustrates the movement of components of a sarcomere muscle cell in relation to one another when Z-Band panels are reciprocated in relation to one another.

* * * * *